United States Patent
Owston

(10) Patent No.: US 12,281,619 B2
(45) Date of Patent: Apr. 22, 2025

(54) HEAT ENGINE SYSTEM COMPRISING A RESERVOIR FOR RECEIVING AND SUPPLYING A WORKING FLUID FROM AND TO A COMPRESSOR VIA A BLEED VALVE AND AN INTAKE VALVE

(71) Applicant: BAE SYSTEMS PLC, London (GB)

(72) Inventor: Jeremy Henry Owston, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/710,368

(22) PCT Filed: Nov. 9, 2022

(86) PCT No.: PCT/GB2022/052828
§ 371 (c)(1),
(2) Date: May 15, 2024

(87) PCT Pub. No.: WO2023/084202
PCT Pub. Date: May 19, 2023

(65) Prior Publication Data
US 2025/0003371 A1    Jan. 2, 2025

(30) Foreign Application Priority Data
Nov. 15, 2021   (GB) ...................... 2116434

(51) Int. Cl.
*F02C 9/18*   (2006.01)
*F02C 6/08*   (2006.01)
(Continued)

(52) U.S. Cl.
CPC ................. *F02C 9/18* (2013.01); *F02C 6/08* (2013.01); *F02C 6/18* (2013.01); *F02C 6/14* (2013.01)

(58) Field of Classification Search
CPC ...... F02C 6/14; F02C 6/16; F02C 6/08; F02C 9/18
See application file for complete search history.

(56) References Cited

U.S. PATENT DOCUMENTS

| | | | |
|---|---|---|---|
| 4,150,547 A * | 4/1979 | Hobson | F02C 6/16 60/659 |
| 2011/0094236 A1 * | 4/2011 | Finkenrath | F02C 7/10 60/39.15 |

(Continued)

FOREIGN PATENT DOCUMENTS

| | | |
|---|---|---|
| FR | 2178386 A5 | 11/1973 |
| JP | H04216492 A | 8/1992 |

(Continued)

OTHER PUBLICATIONS

International Search Report and Written Opinion received for PCT/GB2022/052828. Mailed: Feb. 22, 2023. 7 pages.

(Continued)

*Primary Examiner* — William H Rodriguez
(74) *Attorney, Agent, or Firm* — Finch & Maloney PLLC

(57) ABSTRACT

A heat engine system comprises a compressor, a heat source, and a turbine, each having an inlet and an outlet, and which collectively define part of a working fluid flow circuit. The system further comprises a housing operable to be sealed to define a reservoir in which the compressor, heat source, and turbine are located. The working fluid flow circuit further comprises a compressor-to-heat-source duct which extends between the compressor outlet and the heat source inlet, a heat-source-to-turbine duct which extends between the heat source outlet and the turbine inlet, and a turbine-to-compressor duct which extends between the turbine outlet and the compressor inlet. A bleed valve is provided in flow communication with the compressor outlet, operable to bleed working fluid into the reservoir. An intake valve is (Continued)

provided in flow communication with the compressor inlet operable to allow passage of working fluid from the reservoir to the compressor inlet.

20 Claims, 3 Drawing Sheets

(51) Int. Cl.
*F02C 6/18* (2006.01)
*F02C 6/14* (2006.01)

(56) References Cited

U.S. PATENT DOCUMENTS

| | | | | |
|---|---|---|---|---|
| 2014/0305127 A1* | 10/2014 | Schroder | .................. | F02C 6/16 60/727 |
| 2015/0075173 A1* | 3/2015 | Berti | ........................ | F02C 6/16 60/39.23 |
| 2016/0053682 A1* | 2/2016 | Page | ......................... | F02C 3/30 60/727 |
| 2016/0131031 A1* | 5/2016 | Kraft | ........................ | F02C 6/16 60/773 |
| 2016/0273398 A1* | 9/2016 | Ekanayake | ............... | F02C 6/00 |
| 2022/0252006 A1* | 8/2022 | Michalik | ................... | F02C 1/04 |
| 2022/0254531 A1* | 8/2022 | Eifert | ........................ | F02C 6/18 |

FOREIGN PATENT DOCUMENTS

| | | |
|---|---|---|
| KR | 101629657 B1 | 6/2016 |
| WO | 2023084202 A1 | 5/2023 |

OTHER PUBLICATIONS

GB Search a Report under Section 17 (5) received for GB Application No. 2116434.8. Dated: Mar. 17, 2022. 3 pages.

* cited by examiner

HEAT ENGINE SYSTEM COMPRISING A RESERVOIR FOR RECEIVING AND SUPPLYING A WORKING FLUID FROM AND TO A COMPRESSOR VIA A BLEED VALVE AND AN INTAKE VALVE

FIELD

The present disclosure relates to a heat engine system.

BACKGROUND

Heat engine systems are used to provide power in many different applications. One particular application is the powering of water vessels, including submarines, using a nuclear reactor as a heat source to heat a working fluid which is passed through a closed cycle comprising a compressor and turbine to rotate a shaft and from which other machines can be driven (for example electrical generators).

The heat source and main machinery (e.g. compressor and turbine) is housed within the vessel. Such systems have issues with maintaining the desired mass of working fluid in the cycle. For example leaks may lead to a drop off in power and, if the heat source is nuclear in nature, leaks may be a contamination risk to the rest of the vessel. Additionally, maintaining the mass of working fluid in the closed cycle may mean the power output of the system may only be varied within a limited range.

Hence a heat engine system which provides for improved power output control while also preserving the volume of working fluid available for use in the cycle is highly desirable.

SUMMARY

According to the present disclosure there is provided an apparatus, system and method as set forth in the appended claims. Other features of the invention will be apparent from the dependent claims, and the description which follows.

There may be provided a heat engine system (100, 1100) comprising a compressor (300) having an inlet (302) and an outlet (304), a heat source (400) having an inlet (402) and an outlet (404), and a turbine (500) having an inlet (502) and an outlet (504). The compressor (300), heat source (400) and turbine (500) may define part of a working fluid flow circuit (700). The heat engine system may further comprise a housing (600) which is operable to be sealed to define a reservoir (602) in which the compressor (400), heat source (400), turbine (500) and working fluid flow circuit (700) are located. The working fluid flow circuit (700) may further comprise: a compressor-to-heat-source duct (800) which extends between the compressor outlet (304) and the heat source inlet (402); a heat-source-to-turbine duct (802) which extends between the heat source outlet (404) and the turbine inlet (502); and a turbine-to-compressor duct (804) which extends between the turbine outlet (504) and the compressor inlet (302). A bleed valve (806) may be provided in flow communication with the compressor outlet (304), operable to bleed working fluid into the reservoir (602). An intake valve (808) may be provided in flow communication with the compressor inlet (302) operable to allow the passage of working fluid from the reservoir (602) to the compressor inlet (302).

The bleed valve (806) may be provided in the compressor-to-heat-source duct (800), operable to bleed working fluid passing through the compressor-to-heat-source duct (800) into the reservoir (602).

The intake valve (808) is provided in the turbine-to-compressor duct (804), operable to allow the passage of working fluid from the reservoir (602) into the turbine-to-compressor duct (804) for delivery to the compressor inlet (302).

The heat engine system (1100) may further comprise a fluid flow junction conduit (810) which defines a cavity (812) in flow communication with the bleed valve (806), the intake valve (808) and an opening (814) for fluid communication with the reservoir (602).

The heat engine system (100) may further comprise a control system. The control system may be operable to control the opening and closing of the bleed valve (806). The control system may be operable to control the opening and closing of the intake valve (808). The control system may be operable to control the bleed valve (806) and intake valve (808) independently of one another.

The control system may be operable to control the bleed valve (806) and intake valve (808) to open at the same time as one another and/or close at the same time as one another.

The control system may be operable to control the bleed valve (806) and intake valve (808) to vary the flow through the bleed valve (806) and intake valve (808) relative to one another.

The control system may be operable to control the rate at which the bleed valve (806) and/or intake valve (808) open and close.

The control system may be operable to vary the rate at which the bleed valve (806) and intake valve (808) open and close relative to one another.

The control system may be operable to control the bleed valve (806) and intake valve (808) so that one of the bleed valve (806) and intake valve (808) opens as the other closes such that when one of the bleed valve (806) and intake valve (808) is fully open, the other is fully closed; and when one of the bleed valve (806) and intake valve (808) is 50% open, the other is 50% open.

The compressor (300) and turbine (500) may be rotatable around a common axis (900) and coupled to rotate together around the common axis (900).

The heat source (400) may comprise a nuclear reactor.

There may further be provided a vehicle comprising a heat engine system (100, 1100) according to the present disclosure.

There may also be provided a method of operation of a heat engine system (100, 1100) according to the present disclosure wherein the bleed valve (806) is controlled to bleed working fluid into the reservoir (602). The intake valve (808) may be controlled to allow the passage of working fluid from the reservoir (602) to the compressor inlet (302). The bleed valve (806) and intake valve (808) may be controlled to open and close independently of one another.

The bleed valve (806) and intake valve (808) may be controlled to open at the same time as one another and/or close at the same time as one another.

The bleed valve (806) and intake valve (808) may be controlled such that one of the bleed valve (806) and intake valve (808) opens as the other closes; and when one of the bleed valve (806) and intake valve (808) is fully open, the other is fully closed; and when one of the bleed valve (806) and intake valve (808) is 50% open the other is 50% open.

The bleed valve (806) and intake valve (808) may be controlled to vary the flow through the bleed valve (806) and intake valve (808) relative to one another.

The bleed valve (806) and/or intake valve (808) may be controlled to open and close at different rates relative to one another.

Hence there is provided a heat engine system (e.g. heat source, for example a reactor, and gas turbine) housed within a single (i.e. common) compartment (the reservoir 602) with an atmosphere of the working fluid of the working fluid flow circuit 700. In this way leaks from the working fluid flow circuit 700 can be recycled back into the working fluid flow circuit 700 through the compressor 300, and hence not be lost to the environment outside of the housing 600.

Additionally the system is configured to enable power output control from the system by varying the mass of working fluid in the working fluid flow circuit 700 by flowing working fluid into the reservoir 602 from the working fluid circuit 700 and drawing working fluid from the reservoir into the working fluid circuit 700.

BRIEF DESCRIPTION OF THE FIGURES

Example of the apparatus, system and method of operation of the present disclosure will now be described by way of example only with reference to the figures, in which.

DETAILED DESCRIPTION

The present disclosure relates to a heat engine system 100, 1100. The present disclosure also relates a vehicle 10 comprising a heat engine system 100, 1100 according to the present disclosure, and a method of operation of a heat engine system 100, 1100 according to the present disclosure.

Figure 1:
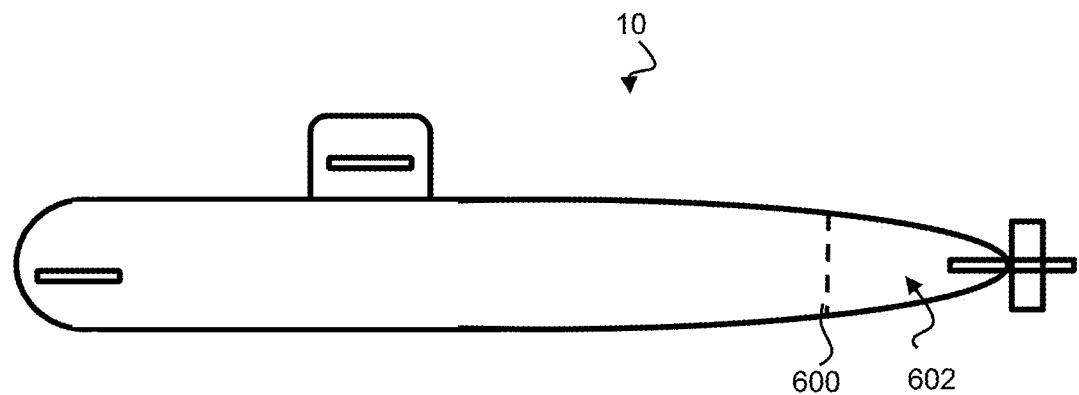
FIG. 1 shows a schematic representation of a vessel (in this case, a submarine) which may include a heat engine system according to the present disclosure.
Figure 2:
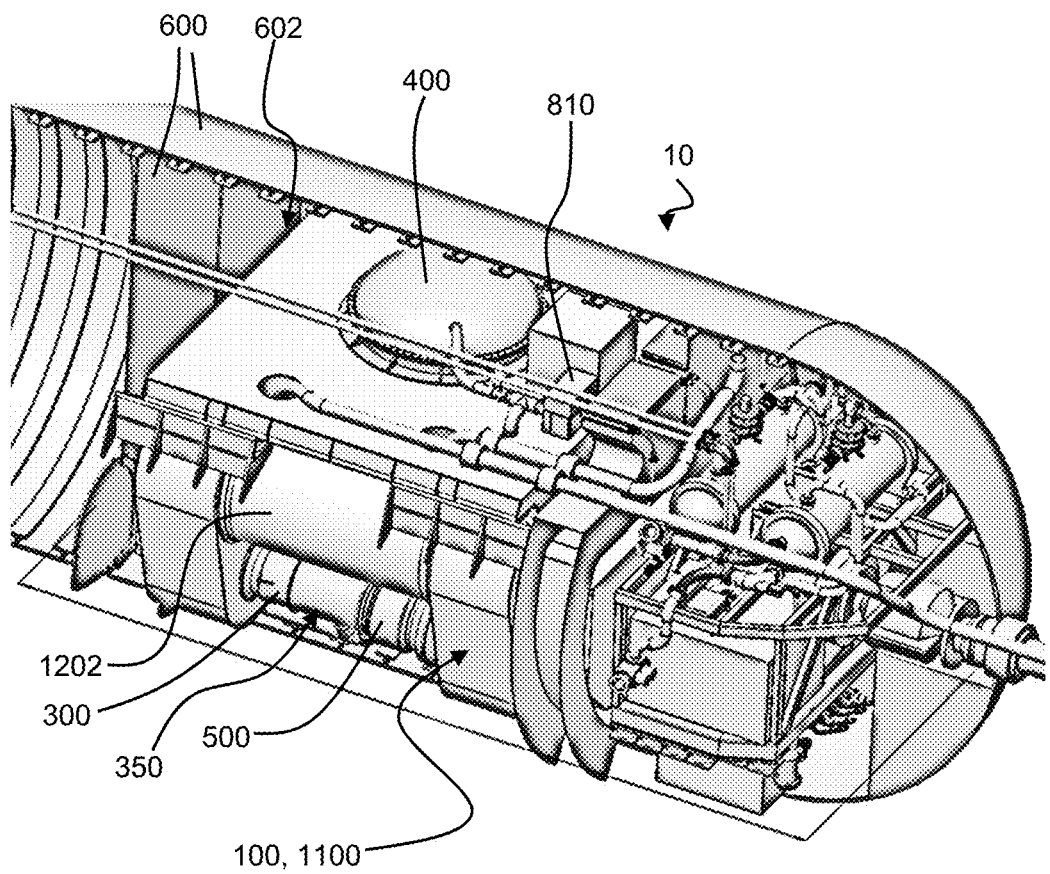
FIG. 2 shows an example of the heat engine system of the present disclosure located, by way of example, in the vessel shown in FIG. 1.

The vehicle 10 may be provided as a vessel, which may be provided as a submersible such as a submarine 10 (as shown in FIG. 1), comprising a heat engine system 100, 1100 according to the present disclosure housed in the vessel (for example as shown in FIG. 2).

Figure 3:
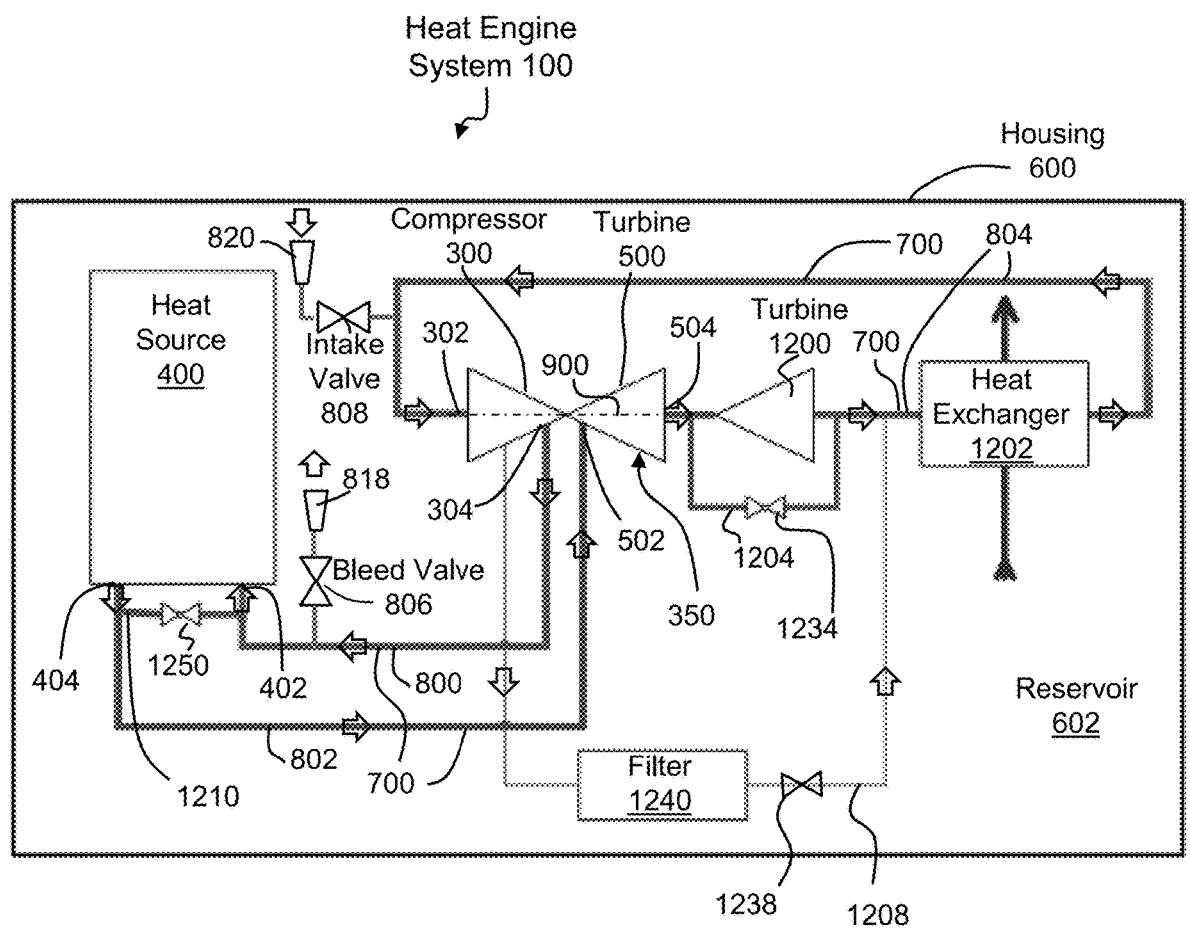
FIG. 3 shows a schematic representation of a first example of a heat engine system of the present disclosure.
Figure 4:
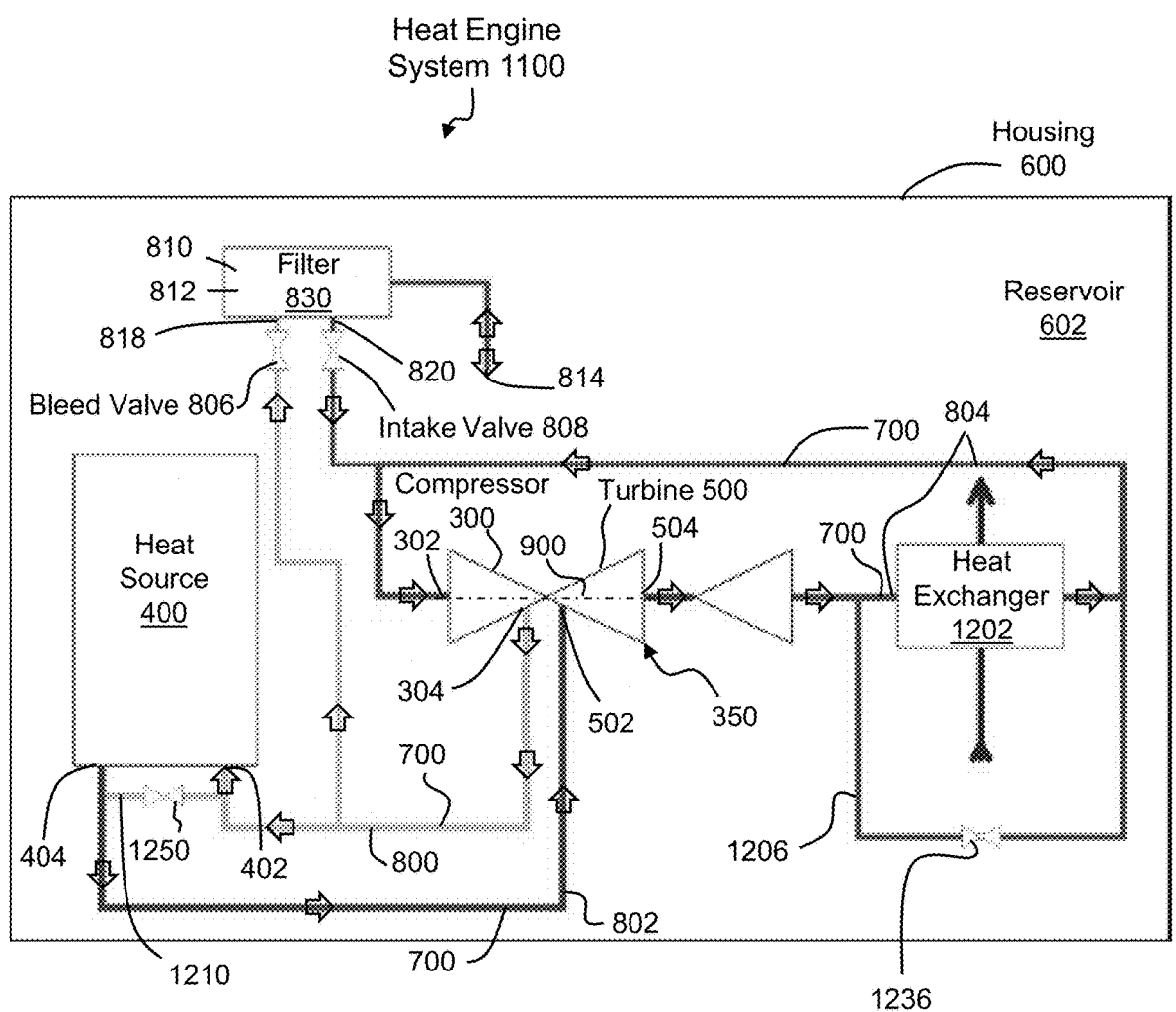
FIG. 4 shows a schematic representation of a second example of a heat engine system of the present disclosure.

FIG. 3 shows a first example of a heat engine 100 according to the present disclosure. FIG. 4 shows a second example of a heat engine 1100 according to the present disclosure.

Both examples may comprise a compressor 300 having an inlet 302 and an outlet 304. There is further provided a turbine 500 having an inlet 502 and an outlet 504. The compressor 300 and turbine 500 are rotatable around a common axis 900 and coupled to rotate together around the common axis 900. The compressor 300 and turbine 500 may form part of a gas turbine 350 assembly.

Both examples of heat engine system 100, 1100 may further comprise a heat source 400 having an inlet 402 and an outlet 404. The heat source 400 may be any appropriate source of heat. The heat source 400 may be a nuclear reactor. In alternative examples the heat source 400 may be chemically fueled, for example using coal, diesel or ethanol as the fuel source.

The compressor 300, heat source 400 and turbine 500 define part of a working fluid flow circuit 700 through which, in operation, a working fluid (for example nitrogen) is passed. The working fluid flow circuit 700 may define a flow path to direct a working fluid to pass through the compressor 300, through the heat source 400 and through the turbine 500, returning to the compressor 300. The working fluid flow circuit 700 may define a flow path to control the flow of working fluid into, through and out of the compressor 300, then into, through and out of the heat source 400; and then into, through and out of the turbine 500 to return to the compressor 300 to restart the cycle.

The working fluid flow circuit 700 may further comprise a free spinning turbine 1200, through which working fluid is passed. The free spinning turbine 1200 may be used to drive a power off take. As shown in relation to the first example of heat engine system 100 in FIG. 3, the working fluid flow circuit 700 may further comprise a first bypass circuit 1204, which provides a bypass flow route past the free spinning turbine 1200. The first bypass 1204 may comprise a first bypass flow control valve 1234.

The working fluid flow circuit 700 may further comprise a heat exchanger 1202, through which working fluid is passed. The heat exchanger 1202 may be operable to remove heat from the working fluid. As shown in relation to the second example of heat engine system 1100 in FIG. 4, the working fluid flow circuit 700 may further comprise a second bypass circuit 1206, which provides a bypass flow route past the heat exchanger 1202. The second bypass 1206 may comprise a second bypass flow control valve 1236.

As shown in relation to the first example of heat engine system 100 in FIG. 3, the working fluid flow circuit 700 may further comprise a third bypass circuit 1208, which provides a bypass flow route from the compressor 300 to a region downstream of the free spinning turbine 1200. The third bypass circuit 1208 may comprise a third bypass flow control valve 1238. The third bypass circuit 1208 may additionally or alternatively comprise a filter 1240 configured for the filtration of particulates and/or chemicals. The third bypass flow control valve 1238 may be provided in series or in parallel with the filter 1240.

The working fluid flow circuit 700 may further comprise a fourth bypass circuit 1210, which provides a bypass flow route between the heat source inlet 402 and heat source outlet 404. The third bypass 1208 may comprise a third flow control valve 1250.

The heat engine system may further comprise a housing 600 which is operable to be sealed to define a reservoir 602 in which the compressor 400, heat source 400, turbine 500 and working fluid flow circuit 700 are located. That is to say, the housing 600 delimits (e.g. determine the limits or boundaries of) the reservoir 602 in which the compressor 300, heat source 400, turbine 500 and working fluid flow circuit 700 are located. The housing 600 may be a discrete (i.e. dedicated) structure, or may comprise a combination of walls which also form parts of the surrounding structure. For example, in the case of a vessel, the walls defining the housing 600 may comprise bulkheads and regions of the hull.

The housing 600 is sealable and configured to contain the working fluid (for example nitrogen). That is to say, the housing 600 may be configured to prevent fluid exchange across the boundary defined by the housing 600. Put another way, the housing 600 may be configured to prevent fluid loss from the reservoir 602 (i.e. from inside the boundary defined by the housing 600 to outside of the boundary defined by the housing 600) and configured to prevent fluid entry into the reservoir 602 (i.e. from outside the boundary defined by the housing 600 to inside the boundary defined by the housing 600).

As shown in FIGS. 3, 4, the working fluid flow circuit 700 may comprise a compressor-to-heat-source duct 800 which extends between the compressor outlet 304 and the heat source inlet 402 for the passage of working fluid between the compressor outlet 304 and heat source inlet 402. The working fluid flow circuit 700 may comprise a heat-source-to-turbine duct 802 which extends between the heat source outlet 404 and the turbine inlet 502 for the passage of working fluid between heat source outlet 404 and turbine inlet 502. The working fluid flow circuit 700 may comprise a turbine-to-compressor duct 804 extends between the turbine outlet 504 and the compressor inlet 302 for the passage of working fluid between turbine outlet 504 and the compressor inlet 302.

A bleed valve 806 may be provided in flow communication with the compressor outlet 304, operable to bleed working fluid into the reservoir 602. An intake valve 808 may be provided in flow communication with the compressor inlet 302 operable to allow the passage of working fluid from the reservoir 602 to the compressor inlet 302.

The bleed valve 806 may be provided in the compressor-to-heat-source duct 800, operable to bleed working fluid passing through the compressor-to-heat-source duct 800 into the reservoir 602, the bleed valve 806 having, and/or in fluid communication with, a vent 818 which opens into the reservoir 602. The intake valve 808 may be provided in the turbine-to-compressor duct 804, operable to allow the passage of working fluid from the reservoir 602 into the turbine-to-compressor duct 804 for delivery to the compressor inlet 302, the intake valve 808 having an intake aperture 820 which opens into the reservoir 602.

As shown in FIG. 4, in relation to the second example of a heat engine 1100, the heat engine system 1100 may further comprise a fluid flow junction conduit 810 which defines a cavity (e.g. volume and/or chamber) 812 in flow communication with the bleed valve 806, the intake valve 808 and an opening 814 for fluid communication with the reservoir 602. The opening 814 may be at the end of a pipe 816, and fluid flow may be from the fluid flow junction conduit 810 into the reservoir 602 or from the reservoir 602 into the fluid flow junction conduit 810.

The fluid flow junction conduit 810 may comprise a filter 830. The filter 830 may be operable to prevent the passage of particulates and/or chemicals from and/or into the working fluid circuit 700.

The heat engine system 100, 1100 may further comprise a control system (i.e. a controller) (not shown) operable to control the opening and closing of the bleed valve 806. The control system (not shown) may be operable to control the opening and closing of the intake valve 808. The control system may be operable to control the bleed valve 806 and intake valve 808 independently of one another.

The control system (not shown) may be operable to control the bleed valve 806 and intake valve 808 to open at the same time as one another. The control system (not shown) may be operable to control the bleed valve 806 and intake valve 808 to close at the same time as one another.

The control system (not shown) may be operable to control the bleed valve 806 and intake valve 808 to vary the flow through the bleed valve 806 and intake valve 808 relative to one another. That is to say, the control system may be operable to control the bleed valve 806 and intake valve 808 to vary the flow through the bleed valve 806 relative to the flow throw the intake valve 808 and to vary the flow through the intake valve 808 relative to the flow throw the bleed valve 806.

The control system may be operable to control the rate at which the bleed valve 806 and/or intake valve 808 open and close.

The control system may be operable to vary the rate at which the bleed valve 806 and intake valve 808 open and close relative to one another.

The control system may be operable to control the bleed valve 806 and intake valve 808 so that one of the bleed valve 806 and intake valve 808 opens as the other closes such that as the flow rate through one of the bleed valve 806 and intake valve 808 increases the flow rate through the other of the bleed valve 806 and intake valve 808 decreases. In one example, when one of the bleed valve 806 and intake valve 808 is fully open, the other is fully closed, and when one of the bleed valve 806 and intake valve 808 is 50% open the other is 50% open.

In operation, the bleed valve 806 and intake valve 808 of the heat engine systems 100, 1100 of the present disclosure are controlled to open and close, example under the control of the control system (not shown). The relative timing of when one of the bleed valve 806 and intake valve 808 is closed or open, or is closing or opening, relative the other bleed valve 806 and intake valve 808 may be controlled according to the required power output of (i.e. power demand on) the heat engine systems 100, 1100. That is to say, the relative timing of when one of the bleed valve 806 and intake valve 808 is closed or open, or is closing or opening, relative the other bleed valve 806 and intake valve 808 may be controlled to govern the mass of working fluid passing through the flow circuit 700.

The basic operation of the systems 100, 1100 is described below in table 1.

TABLE 1

Operation of heat engine system

| Bleed valve 806 | open | closed | open | closed |
|---|---|---|---|---|
| Intake valve 808 | closed | open | open | closed |
| Direction of flow | from compressor outlet 304 to reservoir 602 bleed valve 806 | from reservoir 602 to compressor inlet 302 via intake valve 808 | either direction, depending on pressure difference between reservoir 602 and compressor inlet 302 | no flow between the flow circuit 700 and the reservoir 602 |

Hence the bleed valve 806 may be controlled to open to bleed a proportion of the working fluid flowing through the flow circuit 700 into the reservoir 602, and the intake valve 808 is controlled to open to allow the passage of working fluid from the reservoir 602 to the compressor inlet 302 into the flow circuit 700.

When both the bleed valve 806 and intake valve 808 are open the net flow of working fluid into the flow circuit 700 from the reservoir 602 may be positive (i.e. to increase the amount of working fluid in the working fluid flow circuit 700) or negative (i.e. to decrease the amount of working fluid in the working fluid flow circuit 700. If both the bleed valve 806 and intake valve 808 are closed then there is no controlled flow between the flow circuit 700 and the reservoir 602. That is to say, if both the bleed valve 806 and intake valve 808 are closed, with the exception of any leaks from the flow circuit 700, there is no flow from the flow circuit 700 into the reservoir 602.

The bleed valve 806 and intake valve 808 may be controlled to open and close independently of one another. Hence the bleed valve 806 and intake valve 808 may be at least partially open (i.e. configured to allow flow of the working fluid) at the same time or at different times).

The bleed valve 806 and intake valve 808 may be controlled to open at the same time as one another and/or close at the same time as one another.

Alternatively or additionally, the bleed valve 806 and intake valve 808 may be controlled such that as one of the bleed valve 806 and intake valve 808 opens, to allow flow of the working fluid therethrough, the other closes, such that as the flow rate through one of the bleed valve 806 and intake valve 808 increases the flow rate through the other of the bleed valve 806 and intake valve 808 decreases.

Alternatively or additionally the bleed valve 806 and intake valve 808 may be controlled such that when one of the bleed valve 806 and intake valve 808 is fully open, the other is fully closed.

Alternatively or additionally the bleed valve 806 and intake valve 808 may be controlled such that when one of the bleed valve 806 and intake valve 808 is 50% open the other is 50% open.

The bleed valve 806 and intake valve 808 may be controlled to vary the flow through the bleed valve 806 and intake valve 808 relative to one another.

The bleed valve 806 and/or intake valve 808 may be controlled to open and close at different rates relative to one another.

The bleed valve 806 and/or intake valve 808 may have the same flow area capacity, or may have different flow are capacities. That is to say, when fully open, the bleed valve 806 (and vent 818) and intake valve 808 (and intake aperture 820) may have the same flow area such that the maximum flow rate through both is the same. That is to say, when fully open, the bleed valve 806 and vent 818 may allow the same maximum flow rate as the intake valve 808 and intake aperture 820.

During operation, the reservoir 602 delimited by the housing 600 provides a reserve of working fluid (for example nitrogen gas) at the same pressure as the turbine inlet 502. The pressure at in the reservoir 602 may be controlled to be atmospheric temperature. The pressure in the working fluid flow circuit 700 is greater than atmospheric pressure. This ensures leaks from the pressurised working fluid flow circuit 700 are eliminated as a concern as leaked working fluid can be inducted into the compressor 300 at the compressor inlet 302 whilst keeping the pressures in the reservoir 602 low.

The use of the housing 600 as described as a pressure vessel such that working fluid is vented from the high pressure working fluid flow circuit 700 into the reservoir 602, enables the reduction of mass flow through the turbine 500 to therefore reduce output power levels whilst maintaining constant pressure ratios. This enabled turbine efficiencies close to design at part load to be achieved.

Maintaining the pressure in the reservoir 602 at about atmospheric pressure also obviates the need for the housing 600 to a heavy duty (and hence expensive, heavy and large) pressure vessel. Hence the housing 600 may be a relatively light structure.

As the flow rate through the bleed valve 806 and intake valve 808 are changed the balance of working fluid lost from the reservoir 602 versus gas working fluid gained in the reservoir 602 is changed resulting in either a net loss of gas or net gain of working fluid to the working fluid flow circuit 700 from the reservoir 602 until the system achieves a steady state.

The relatively large reservoir 602 volume required to house the reactor, compressor, turbine and other equipment means that working fluid can be vented into, or withdrawn from, the reservoir small pressure change in the reservoir 602.

The use of nitrogen as a working fluid ensures that a large power change can be accomplished by simply venting the working fluid flow circuit 700 into the reservoir 602.

In examples in which both the bleed valve 806 and intake valve 808 are opened at the same time (thereby enabling flow therethrough) introduces proportional power control in response to the valve opening/closure position of bleed valve 806 and intake valve 808. This proportional power control simplifies the turbine power control system as only valve position needs to be controlled rather than valve position and valve opening period. This allows simple enabling of droop control required for stable splitting of load between multiple generators.

For stable power control when supplying an electrical grid, especially where there are multiple generators, the inclusion of droop is critical. Droop in a traditional turbine is controlled by a governor and is a proportional response of turbine power to an error from a reference speed as indicated by equation [1]

$$\text{Droop \%} = (\text{No load speed} - \text{Full load speed})/(\text{No load speed}) \quad [1]$$

$$\text{Droop \%} = \frac{\text{No load speed} - \text{Full load speed}}{\text{No load speed}}$$

As described above, the opening of the bleed valve 806 and intake valve 808 may be coupled. In such a mode of operation the mass of working fluid in the working fluid flow circuit 700 becomes a function of the rate of bleed-off from the working fluid flow circuit 700 vs re-admission to the working fluid flow circuit 700. Hence power level becomes proportional to the combined open and closure position of the bleed valve 806 and intake valve 808 may. Droop control is therefore simple to implement through placing the valve position relative to the speed error of the turbine to a reference speed. With this approach part load efficiency can be maintained as a significant proportion of the power reduction is through lowering of the mass within the working fluid flow circuit 700 where flow bypassing the turbine contribute a small proportion of the power change increment. Additionally, the flow bypassing the turbine ensures increased damping during power control, and can be tuned through selecting valve opening and closing profile to achieve a desired level of system stability.

The configuration of the heat engine system 100, 1100 of the present disclosure places the heat source 400 (e.g. reactor) and other main machinery within a single compartment. Placing all the heat engine components including the working fluid flow circuit 700 flow paths within a single reservoir 602 allows the reservoir 602 to be filled with the same fluid as the working fluid flow circuit 700. The net result is that leaks from the working fluid flow circuit 700 enter the reactor reservoir 602 where the pressure is approximately atmospheric with limited pressure driver for further leaks to the environment.

This design approach largely removes the driving mechanism for transport of unwanted features of the heat source (e.g. chemicals or radiation) outside of the plant boundary defined by the housing 600. More importantly with the compressor inlet also operating at the same pressure as the reservoir 602, any gas leaks from the pressurised section of the working fluid flow circuit 700 can effectively be drawn back into the working fluid flow circuit 700 at the compressor inlet.

Such a system, with a closed cycle gas cooled reactor, offers further advantages relating to power control.

Additionally because of the large volume of gas in the reservoir 602 the pressures in the reservoir 602 do not vary significantly following pressurisation and depressurisation of the working fluid flow circuit 700. This allows a simple valve to act as bleed into the reservoir 602 without the need to include compressors to store the removed working fluid flow circuit 700 gas in high pressure cylinders. As a result rapid power changes can be accomplished using inventory control, maintaining design point efficiencies at part load removing the need for further complexity in the plant control design.

The apparatus, system and method of the present disclosure permit a rapid rate of change of power output since the movement of working fluid is between adjacent volumes (i.e. the working fluid flow circuit 700 and the reservoir 602) working at similar pressure. Hence further control systems and working fluid storage systems for rapid power transients are not required.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A heat engine system comprising:
a compressor having an inlet and an outlet;
a heat source having an inlet and an outlet; and
a turbine having an inlet and an outlet;
wherein the compressor, heat source and turbine define part of a working fluid flow circuit;
the heat engine system further comprising a housing which is operable to be sealed to define a reservoir in which the compressor, heat source, turbine and working fluid flow circuit are located;
wherein the working fluid flow circuit includes
a compressor-to-heat-source duct which extends between the compressor outlet and the heat source inlet,
a heat-source-to-turbine duct which extends between the heat source outlet and the turbine inlet, and
a turbine-to-compressor duct which extends between the turbine outlet and the compressor inlet;
wherein a bleed valve is provided in flow communication with the compressor outlet, operable to bleed working fluid into the reservoir; and
wherein an intake valve is provided in flow communication with the compressor inlet, operable to allow the passage of working fluid from the reservoir to the compressor inlet.

2. The heat engine system of claim 1, wherein:
the bleed valve is provided in the compressor-to-heat-source duct, operable to bleed working fluid passing through the compressor-to-heat-source duct into the reservoir; and
the intake valve is provided in the turbine-to-compressor duct, operable to allow the passage of working fluid from the reservoir into the turbine-to-compressor duct for delivery to the compressor inlet.

3. The heat engine system of claim 1, further comprising: a fluid flow junction conduit which defines a cavity in flow communication with the bleed valve, the intake valve, and an opening for fluid communication with the reservoir.

4. The heat engine system of claim 1, further comprising a control system, the control system being operable to:
control the opening and closing of the bleed valve; and
control the opening and closing of the intake valve;
wherein control system is operable to control the bleed valve and intake valve independently of one another.

5. The heat engine system of claim 4, wherein the control system is operable to control the bleed valve and intake valve to:
open at the same time as one another; and/or
close at the same time as one another.

6. The heat engine system of claim 4, wherein the control system is operable to control the bleed valve and intake valve to vary the flow through the bleed valve and intake valve relative to one another.

7. The heat engine system of claim 4, wherein the control system is operable to control the rate at which the bleed valve and/or intake valve open and close.

8. The heat engine system of claim 7, wherein the control system is operable to vary the rate at which the bleed valve and intake valve open and close relative to one another.

9. The heat engine system of claim 4, wherein the control system is operable to control the bleed valve and intake valve so that one of the bleed valve and intake valve opens as the other closes such that:
when one of the bleed valve and intake valve is fully open, the other is fully closed; and
when one of the bleed valve and intake valve is 50% open, the other is 50% open.

10. The heat engine system of claim 1, wherein the compressor and turbine are rotatable around a common axis and coupled to rotate together around the common axis.

11. The heat engine system of claim 1, wherein the heat source comprises a nuclear reactor.

12. A vehicle comprising a heat engine system of claim 1.

13. A method of operation of a heat engine system, the heat engine system including
a compressor having an inlet and an outlet,
a heat source having an inlet and an outlet, and
a turbine having an inlet and an outlet,
wherein the compressor, heat source and turbine define part of a working fluid flow circuit,
the heat engine system further comprising a housing which is operable to be sealed to define a reservoir in which the compressor, heat source, turbine and working fluid flow circuit are located,
wherein the working fluid flow circuit includes
a compressor-to-heat-source duct which extends between the compressor outlet and the heat source inlet,
a heat-source-to-turbine duct which extends between the heat source outlet and the turbine inlet, and
a turbine-to-compressor duct which extends between the turbine outlet and the compressor inlet;
wherein a bleed valve is provided in flow communication with the compressor outlet, operable to bleed working fluid into the reservoir; and
wherein an intake valve is provided in flow communication with the compressor inlet, operable to allow the passage of working fluid from the reservoir to the compressor inlet,
the method comprising:
controlling the bleed valve to bleed working fluid into the reservoir; and
controlling the intake valve to allow the passage of working fluid from the reservoir to the compressor inlet; and
controlling the bleed valve and intake valve to open and close independently of one another.

14. The method of claim 13, wherein the bleed valve and intake valve are controllable to:
open at the same time as one another; and/or
close at the same time as one another.

15. The method of claim 13, wherein:
the bleed valve and intake valve are controlled such that one of the bleed valve and intake valve opens as the other closes; and
when one of the bleed valve and intake valve is fully open, the other is fully closed; and
when one of the bleed valve and intake valve is 50% open the other is 50% open.

16. The method of claim 13, wherein the bleed valve and intake valve are controlled to vary the flow through the bleed valve and intake valve relative to one another.

17. The method of claim 13, wherein the bleed valve and/or intake valve are controlled to open and close at different rates relative to one another.

18. A heat engine system comprising:
a working fluid flow circuit defined at least in part by a compressor, a heat source, and a turbine, the compressor having an inlet and an outlet, the heat source having an inlet and an outlet, and the turbine having an inlet and an outlet, wherein the working fluid flow circuit includes
a compressor-to-heat-source duct which extends between the compressor outlet and the heat source inlet,
a heat-source-to-turbine duct which extends between the heat source outlet and the turbine inlet, and
a turbine-to-compressor duct which extends between the turbine outlet and the compressor inlet;
a reservoir;
a bleed valve in flow communication with the compressor outlet, and operable to bleed working fluid into the reservoir; and
an intake valve in flow communication with the compressor inlet, and operable to allow the passage of working fluid from the reservoir to the compressor inlet;
wherein the bleed valve is in the compressor-to-heat-source duct, and the intake valve is in the turbine-to-compressor duct.

19. The heat engine system of claim 18, wherein the bleed valve is controlled to open and close at different rates relative to intake valve, and/or the intake valve is controlled to open and close at different rates relative to the bleed valve.

20. The heat engine system of claim 18, further comprising a control system operable to control the bleed valve and intake valve independently of one another.

* * * * *